No. 819,736. PATENTED MAY 8, 1906.
A. H. DAUS.
ELECTRIC MOTOR CONTROL SYSTEM.
APPLICATION FILED MAR. 17, 1905.

WITNESSES:
Fred. H. Miller
R. J. Dearborn

INVENTOR
Adolph H. Daus
BY
Wesley Carr
ATTORNEY

UNITED STATES PATENT OFFICE.

ADOLPH H. DAUS, OF CHICAGO, ILLINOIS, ASSIGNOR TO WESTINGHOUSE ELECTRIC & MANUFACTURING COMPANY, A CORPORATION OF PENNSYLVANIA.

ELECTRIC-MOTOR-CONTROL SYSTEM.

No. 819,738.　　　Specification of Letters Patent.　　　Patented May 8, 1906.

Application filed March 17, 1905. Serial No. 250,643.

*To all whom it may concern:*

Be it known that I, ADOLPH H. DAUS, a citizen of the United States, and a resident of the city of Chicago, in the county of Cook and State of Illinois, have invented a new and useful Improvement in Electric-Motor-Control Systems, of which the following is a specification.

My invention relates to systems for electric-motor control, and particularly to such systems as are employed in connection with electric railway cars or vehicles.

The object of my invention is to provide a means for automatically interrupting the supply-circuit in case a motor-armature becomes accidentally grounded which shall be sensitive to the flow of a small grounded current and independent of any normal motor-current.

Heretofore when the armature of a motor became grounded, especially if several motors were comprised in one equipment, as is common in railway-service, serious damage generally occurred to the grounded armature before the main-line-circuit breaker was actuated to open the circuit.

A sensitive device that may readily be applied to one or more motors is provided by my invention, which is illustrated in the accompanying drawings, in which—

Figure 1:
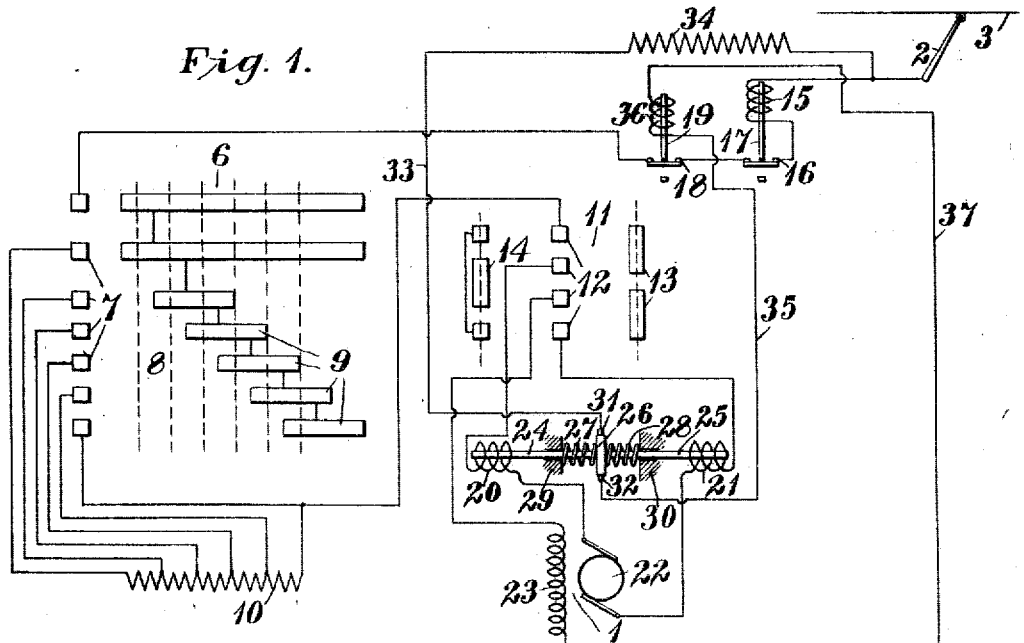
Figure 2:
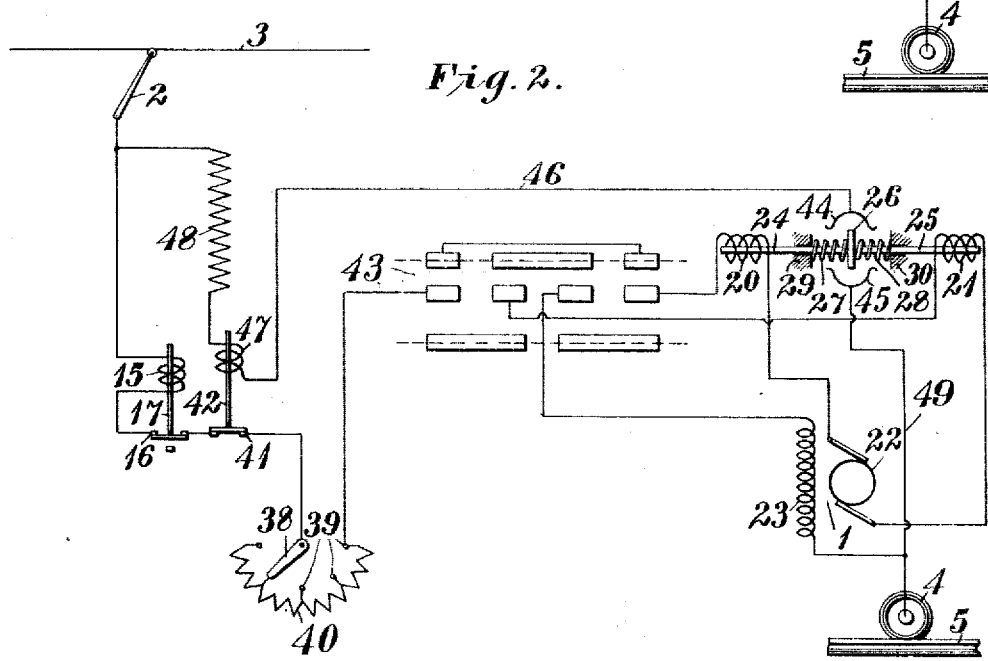

Figure 1 is a diagrammatic view of a control system constructed in accordance therewith and applied to a single motor. Fig. 2 is a similar diagram embodying a slightly-different arrangement in the circuit-breaker mechanisms from that of Fig. 1.

My invention is illustrated in Fig. 1 as applied to a single motor 1, that is connected to one terminal of a suitable source of electrical energy by means of a trolley 2 and a trolley-conductor 3, with which it engages, and to the other terminal of such source by means of the truck-wheels 4 of the vehicle that is propelled by the motor and the track-rails 5, upon which the wheels run.

As here illustrated, the motor is started and stopped and its speed is controlled by means of a simple rheostatic controller 6, comprising a set of fingers 7, a drum 8, provided with a set of contact-segments 9, and a resistance member 10, different parts of which are connected to the contact-fingers in such manner as to insure a gradual variation in the amount of resistance in the motor-circuit as the drum 8 is rotated, and the direction of rotation of the motor-armature is controlled by a simple reversing-switch 11, comprising a set of fingers 12 and movable contact-pieces 13 and 14. This diagrammatic representation of circuit connections and controlling apparatus is intended to be merely indicative of any operative means for supplying current to a motor and so controlling the current-supply as to determine the direction of movement of the motor and to start, stop, and vary the speed of the motor, as may be required for the service in connection with which it is used.

The illustration of a single motor is without special significance, except that it enables me to simplify the illustration and description of the apparatus which is combined in my invention in order to provide an operative system, and it will be therefore understood that a system in which my invention is utilized may and generally will comprise two or more motors and controlling devices by means of which such motors may be connected successively in series and in parallel and that the circuit connections and resistance may be otherwise varied in such manner and to such extent as shall be found desirable in order to secure maximum efficiency of service.

As here illustrated, the motor-circuit is from the trolley-conductor 3 through the trolley 2, the coil 15, and separable contact-terminals 16 of a circuit-breaker 17, the separable contact-terminals 18 of a second circuit-breaker 19, certain of the contact-terminals of the controller 6, more or less of the resistance 10, according to the position of the controller 6, the reversing-switch 11, the one or the other of two solenoids 20 and 21, according to the position of the reversing-switch, the motor-armature 22, the reversing-switch 11, the field-magnet winding 23 of the motor 1, and the truck-wheels 4 to the return-conductor 5 of the supply-circuit. The cores 24 and 25 of the respective solenoids 20 and 21 are connected together rigidly and are provided with a contact or bridge piece 26, which is normally held in and is returned to a position midway between the solenoids by means of two coil-springs 27 and 28, which are interposed, respectively, between said contact-piece 26 and suitable abutments 29 and 30. The contact-piece 26 normally engages two contact-terminals 31 and 32, the former of which is connected, by means of a conductor 33 and a suitable resistance 34, to the trolley 2, and the latter of which is connected, by means of a conductor 35, to one terminal of the actuating-coil 36 of the circuit-breaker 19, the other terminal of this coil being connected, by means of a conductor 37, to the truck-wheels 4 or other means for making contact with the return-conductor 5. It will of course be understood that the local tripping-circuit that is opened and closed by the contact-terminals 26, 31, and 32 need not necessarily be a shunt to the motor-circuit, but may be otherwise supplied with current, if desired.

It will be seen from the foregoing description of apparatus and circuits that when such apparatus and circuits are in normal operation the armature-current of the motor 1 traverses both solenoids 20 and 21, and since they magnetically oppose each other the contact device 26 will be maintained in engagement with the terminals 31 and 32 and the local circuit, which is thus completed through the resistance 34 and the circuit-breaker coil 36, will so energize this coil as to maintain the contact-terminals 18 in engagement.

In case an accidental ground occurs either side of the armature 22, however, the pull exerted by one of the solenoids 20 and 21 will overcome that exerted by the other, and the contact device 26 will consequently be moved from its position in which it makes engagement with the terminals 31 and 32, thereby interrupting the shunt-circuit and deënergizing the circuit-breaker winding 36. When this winding is deënergized, the circuit-breaker terminals will separate under the action of gravity or such other means as may be employed to effect this movement, and the motor will be thus cut out of circuit.

As soon as the main circuit is opened the springs 27 and 28 will return the contact member 26 into engagement with the terminals 31 and 32, and thus close the shunt-circuit. As soon as the shunt-circuit is closed the coil 36 becomes energized and moves the contact members 18 into engagement. In order to prevent closure of the motor-circuit while the armature of the motor remains grounded, I provide the circuit-breaker 17, and since the winding 15 is connected in series in the motor-circuit the contact-terminals 16 will separate as soon as the motor-circuit is opened, and they will not be again brought into engagement except at the will of the attendant.

In Fig. 2 I have shown a system which for convenience of illustration is also indicated as a single-motor system, and in order to still further simplify the illustration and description I have shown a switch-arm 38 for engaging contact-terminals 39, with which the controller resistance 40 is provided instead of the drum-controller. (Shown in Fig. 1.) As illustrated in this figure, the motor-circuit is from the trolley-conductor 3 through the trolley-conductor 2, the coil 15 and the separable terminals 16 of the circuit-breaker 17, the separable terminals 41 of a circuit-breaker 42, more or less of the resistance 40, according to the position of the arm 38, the reversing-switch 43, either the solenoid 20 or the solenoid 21, depending upon the position of the reversing-switch, the armature 22, the other solenoid, the reversing-switch, the field-magnet 23, and the wheel or wheels 4 and to return-conductor 5. The solenoid-cores 24 and 25 are connected together and provided with a contact-piece 26, which is normally held in mid-position by means of springs 27 and 28, the outer ends of which engage, respectively, with abutments 29 and 30 in the same manner as that already described in connection with Fig. 1. In this case, however, the contact member 26 is normally out of engagement with double contact-terminals 44 and 45, the former of which is connected, by means of a conductor 46, to one terminal of the actuating-coil 47 of the circuit-breaker 42, the other terminal of this coil being connected, through a resistance 48, to the trolley 2. The other double contact-terminal 45 is connected, by means of a conductor 49, to the truck wheel or wheels 4. These parts just described constitute a normally open local circuit, and when this circuit is open the circuit-breaker coil 47 is of course deënergized and the separable terminals 41 are in engagement.

In case the armature becomes accidentally grounded the pull exerted by one of the solenoids 20 and 21 will overcome that exerted by the other, and the contact member 26 will be correspondingly moved in the one direction or the other to engage the contact-terminals 44 and 45, and thus complete the local circuit. When this circuit is completed, sufficient current will flow therethrough to energize the circuit-breaker coil 47, which will in turn open the motor-circuit. As soon as this circuit is opened the coil 15 of the circuit-breaker 17 will be deënergized and its contact-terminals will separate and will not again come into engagement until they are brought into such engagement at the will and by the voluntary act of the attendant.

It is to be understood that the circuit-breaker 17 of Fig. 1 is merely indicative of any suitable means for preventing automatic reclosure of the motor-circuit while an armature is grounded, and it may be replaced by any other device that will effect the desired result—such, for example, as a breaker of the no-current release type in the shunt or local circuit. Substantially the same is true of the modification shown in Fig. 2, except that the device to be employed in lieu of the breaker 17 should be so constructed and connected as to prevent any automatic opening of the local or shunt circuit after it has been closed by reason of a grounded armature.

Arrangements of circuits which differ from those which I have specifically illustrated and described may be employed in order to obtain the results which are secured by the means here shown, and since it is impracticable to specifically set forth every conceivable variation of circuits and connections whereby accidental grounding of an armature may result in opening the main motor-circuit I desire it to be understood that all variations from what I have here set forth that do not materially change the mode of operation or result are within the scope of my invention.

I claim as my invention—

1. The combination with a series electric motor, of normally-balanced coils in the motor-circuit, an interrupting device for said circuit, and a local governing-circuit for said interrupting device that causes said interrupting device to open the motor-circuit when the pulls of the normally-balanced coils are rendered unequal by an accidental ground connection.

2. The combination with a series electric motor, of an interrupting device in the motor-circuit, a local circuit having a controlling-coil for said interrupting device, an opening and closing device for the local circuit, and opposing coils in the motor-circuit the one or the other of which actuates the movable contact member of said opening and closing device when the motor-armature becomes grounded.

3. The combination with a series electric motor and an interrupting device for its circuit, of a local controlling-circuit for said interrupting device, a movable contact member for opening and closing the local circuit and two coils in the motor-armature circuit that act magnetically upon said movable contact member in opposition to each other and the one or the other of which actuates said movable member when the motor becomes grounded.

4. The combination with a series electric motor and an interrupting device for its circuit, of a local circuit for controlling said interrupting device and having adjacent contact-terminals, a movable bridge-piece for making and breaking contact with said terminals, springs for normally holding said bridge-piece in mid-position, oppositely-acting coils in the motor-circuit at opposite sides of the motor-armature that are normally of equal strength but are unbalanced when the armature is grounded, and cores or armatures for said coils that are connected to the movable bridge-piece.

5. The combination with a series electric motor and an interrupting device for its circuit, of a local circuit for controlling said interrupting device and having adjacent contact-terminals, a movable bridge-piece for making and breaking contact with said terminals, springs for normally holding said bridge-piece in mid-position, oppositely-acting coils in the motor-circuit at opposite sides of the motor-armature that are normally of equal strength but are unbalanced when the armature is grounded, and means for preventing automatic reclosure of the motor-circuit after it has been automatically opened.

6. The combination with an electric motor, of means for automatically opening the motor-circuit when the armature becomes grounded and means for preventing reëstablishment of the circuit so long as the grounded condition is maintained.

7. The combination with a series electric motor, of means for automatically opening the motor-circuit when the armature becomes grounded and means for preventing a reëstablishment of the circuit while the armature remains grounded.

In testimony whereof I have hereunto subscribed my name this 28th day of February, 1905.

ADOLPH H. DAUS.

Witnesses:
  JOHN M. BLAKELEY,
  M. B. LAMBERT.